(12) United States Patent
Destraves et al.

(10) Patent No.: US 11,152,685 B2
(45) Date of Patent: Oct. 19, 2021

(54) ANTENNA FOR AN ELECTRONIC MEMBER OF A TIRE

(71) Applicant: COMPAGNIE GENERALE DES ETABLISSEMENTS MICHELIN, Clermont-Ferrand (FR)

(72) Inventors: Julien Destraves, Clermont-Ferrand (FR); Sebastien Noel, Clermont-Ferrand (FR); Annabel Tourenne, Clermont-Ferrand (FR); Nicolas Chevaux, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 0 days.

(21) Appl. No.: 16/635,231

(22) PCT Filed: Jul. 30, 2018

(86) PCT No.: PCT/FR2018/051956
§ 371 (c)(1),
(2) Date: Jan. 30, 2020

(87) PCT Pub. No.: WO2019/025713
PCT Pub. Date: Feb. 7, 2019

(65) Prior Publication Data
US 2021/0104808 A1 Apr. 8, 2021

(30) Foreign Application Priority Data
Jul. 31, 2017 (FR) ...................................... 1757278

(51) Int. Cl.
*H01Q 1/22* (2006.01)
*B60C 19/00* (2006.01)
*H01Q 1/36* (2006.01)

(52) U.S. Cl.
CPC ........... *H01Q 1/2241* (2013.01); *B60C 19/00* (2013.01); *H01Q 1/362* (2013.01)

(58) Field of Classification Search
CPC ....... H01Q 1/2242; H01Q 1/362; H60C 19/00
See application file for complete search history.

(56) References Cited

U.S. PATENT DOCUMENTS

| 4,960,473 A | 10/1990 | Kim et al. |
| 5,739,232 A * | 4/1998 | Hazell .................. C08F 291/00 526/240 |
| 8,462,077 B2 | 6/2013 | Sinnett et al. |

(Continued)

FOREIGN PATENT DOCUMENTS

| EP | 2 765 648 A1 | 8/2014 |
| JP | 2000-53939 A | 2/2000 |

(Continued)

OTHER PUBLICATIONS

International Search Report dated Oct. 24, 2018, in corresponding PCT/FR2018/051956 (8 pages).

*Primary Examiner* — Seokjin Kim
(74) *Attorney, Agent, or Firm* — Venable LLP (57) ABSTRACT

A half-wave radiating antenna for an electronic member of a tire, the length of which is suitable for operating in the frequency range between 860 MHz and 960 MHz, includes a core coated with a brass coating, such that the thickness of the brass coating is between 1.0 and 2.0 μm.

15 Claims, 5 Drawing Sheets

(56) References Cited

U.S. PATENT DOCUMENTS

| | | | |
|---|---|---|---|
| 8,766,874 B2 | 7/2014 | Sinnett et al. | |
| 9,490,531 B2 | 11/2016 | Robert et al. | |
| 9,496,618 B2 | 11/2016 | Robert et al. | |
| 2006/0014867 A1* | 1/2006 | Green | C09J 11/04 524/186 |
| 2008/0158072 A1 | 7/2008 | Logan et al. | |
| 2011/0032174 A1 | 2/2011 | Sinnett et al. | |
| 2013/0185929 A1* | 7/2013 | Robert | G06K 19/07773 29/600 |
| 2013/0194157 A1 | 8/2013 | Robert et al. | |
| 2013/0299597 A1 | 11/2013 | Sinnett et al. | |
| 2014/0073071 A1* | 3/2014 | Diorio | G06K 19/07745 438/26 |
| 2014/0231503 A1* | 8/2014 | Arimura | H01L 21/82 235/375 |
| 2018/0264898 A1 | 9/2018 | Lallement et al. | |
| 2019/0205722 A1* | 7/2019 | Hong | G06K 19/077 |
| 2019/0322142 A1* | 10/2019 | Lallement | B60C 23/0493 |
| 2019/0341673 A1 | 11/2019 | Destraves et al. | |
| 2020/0067171 A1 | 2/2020 | Destraves et al. | |

FOREIGN PATENT DOCUMENTS

| | | |
|---|---|---|
| WO | 99/29522 A1 | 6/1999 |
| WO | 03/105511 A1 | 12/2003 |
| WO | 2009/134243 A1 | 11/2009 |
| WO | 2012/020202 A1 | 2/2012 |
| WO | 2012/020203 A1 | 2/2012 |
| WO | 2017/046245 A1 | 3/2017 |

\* cited by examiner

ANTENNA FOR AN ELECTRONIC MEMBER OF A TIRE

FIELD OF THE INVENTION

The invention relates to the field of electronic members for tyres.

PRIOR ART

An electronic member is known from the prior art which comprises two antennas that are connected to an electronic device, for example a chip, mounted on a wafer. Each antenna is substantially helical in shape. Each antenna comprises a steel core that is coated directly with a coating of brass, which is an alloy of copper and of zinc in proportions of about 75% and 25%, respectively.

It is known that the electromagnetic conduction for such an antenna occurs mainly via a skin effect, i.e. it mainly occurs in the exterior layers of the antenna. The thickness of this skin is in particular dependent on the frequency of the radiation and on the material from which the conduction layer is made. By way of example, for UHF (for example 915 MHz), the skin thickness is 2.1 μm for silver, 2.2 μm for copper, and 4.4 μm for brass.

To manufacture the antenna, a bare, filiform core, unwound from a storage reel, is shaped by deforming it plastically in order to endow it with a helical shape. The bare helical core is then coated with the brass coating. The coating step is carried out in an electrolytic bath.

It is also possible to shape the antenna after it has been coated with the brass coating, as proposed in document WO 2012/020203.

As recalled above, for a brass-coated antenna to operate optimally at UHF, the thickness of the coating layer should not be less than 4.4 micrometres.

However, such antennas are highly specific and thus require an expensive manufacturing process. A thickness of more than four microns may also lead to non-uniformities in the brass layer, which could become weak points in the antenna when in service.

BRIEF DESCRIPTION OF THE INVENTION

One subject of the invention is a half-wave radiating antenna for an electronic member, the length of which is suitable for operating in the frequency range between 860 MHz and 960 MHz, including a core coated with a brass coating, the antenna being intended for incorporation within a rubber mass, in particular a tyre, characterized in that the thickness of the brass coating is between 0.5 and 4.0 μm.

Surprisingly, the applicant has observed that such an antenna with a brass coating having a thickness of below 4.0 μm exhibits electromagnetic conduction properties that are sufficient for use in a rubber mass, in particular a tyre. Below 0.5 μm, conduction is too severely disrupted and above 4.0 μm, the cost of the coating and of manufacturing the antenna becomes substantially higher.

Specifically, it is known that radiocommunication in the UHF band for electronic members incorporated within a rubber mass and for the available frequency ranges is not satisfactory above 1 GHz. Consequently, the frequency range between 860 MHz and 960 MHz constitutes the highest frequency range in terms of frequency that can be used for these electronic members that are incorporated within a rubber mass such as a tyre. Since the length of the half-wave radiating antenna is inversely proportional to the communication frequency in its medium in order to operate optimally, this frequency range is used so as to decrease the length of the antenna to the greatest possible extent and thus to facilitate the incorporation of the antenna and the associated electronic member within the tyre. Lastly, the radiating antenna is optimized for far-field, allowing radiofrequency communication with an external reader that is several metres away.

Preferably, the thickness of the brass coating is between 1 and 2 μm, highly preferably, the thickness of the brass coating ranges from 1.2 to 1.8 μm.

The brass outer coating which performs the function of conduction layer allows an electromagnetic signal to be conducted by skin effect between the antenna and the electronic device that is connected thereto. The thickness of the coating is dependent on the process for producing this coating. It is relatively easy and inexpensive to produce a coating layer ranging from 1.2 to 1.8 μm for the radiofrequency antennas used in the electronic members intended for incorporation within a tyre. The coating step is conventionally carried out in an electrolytic bath.

Preferably, the core of the antenna is made of steel.

Preferably, the diameter of the wire of the core is between 0.15 and 0.32 mm.

Above 0.32 mm, the antenna becomes too difficult to shape and below 0.15 mm, the process for obtaining the wire becomes more complex and the mechanical strength of the antenna becomes insufficient.

Preferably, the carbon content of the steel of the core is below 1% and preferably between 0.5 and 0.8%.

This low carbon content is highly positive for the mechanical properties of the steel. The purity of the steel is enhanced, i.e. there are fewer impurities and this increases the strength of the antenna while facilitating the shaping thereof without breakage.

The antenna may also comprise an adhesive outer layer for adhering the antenna to the rubber which coats the brass coating or conduction layer. As its name indicates, this layer ensures lasting intimate contact between the adjacent rubber mass and the antenna after a step of crosslinking the rubber mass.

Preferably, the adhesive outer layer directly coats the conduction layer. As a variant, the conduction layer could be coated with one or more adhesive layers.

The adhesive layer may comprise a water-based and non-metallic adhesive.

This non-metallic adhesive may comprise two layers that are applied successively, and the total thickness of which is between 1 and 40 μm.

Below 1 μm the success of the adhesion of the antenna to the adjacent rubber may be compromised and above 40 μm the adhesive layer becomes too stiff, which may result in fatigue problems when the antenna is in service.

Chemlok 8210 and 8007 by LORD Corp. are such an adhesive. They are preferably deposited by spraying in order to obtain a high level of uniformity with low thickness.

The adhesive layer may also be imide-based. It is preferably also applied by spraying, which allows a thickness of about 2 μm to be obtained. Chemlok 6411 or Chemosil 411-NL is such an adhesive.

Preferably, the antenna comprises at least one helical portion. The antenna is preferably intended for incorporation within a tyre. When the tyre is in operation, it is subjected to stresses and deformations which are transmitted to the antenna. The helical shape allows the endurance of the antenna with respect to the stresses to which the antenna is subjected to be enhanced. Specifically, the helical shape endows the antenna with flexibility, allowing it to be deformed without risk of breaking, which would both render the electronic function inoperative and risk damaging the tyre. Preferably, the outer diameter of the helical portion is between 0.8 and 1.5 mm and the pitch of the helical portion is between five and 15 turns per centimetre.

Another subject of the invention is an electronic member comprising a radiofrequency transponder with a radiating antenna that is connected to the electronic member, the antenna being such as defined above.

Radiofrequency transponders conventionally comprise an electronic chip and a radiating antenna able to communicate with an external radiofrequency reader.

According to a first embodiment, the radiating antenna comprising two helical antenna segments, the electronic chip is galvanically connected to the two helical antenna segments.

According to another embodiment, the radiofrequency transponder in addition comprises a primary antenna electrically connected to the electronic chip, wherein the primary antenna is inductively coupled to the radiating antenna, and wherein the radiating antenna is a dipole antenna consisting of a single-strand helical spring.

This second embodiment has the advantage of mechanically disassociating the radiating antenna from the electronic components of the transponder and thus of avoiding the weak point of conventional transponders, namely the zone in which the antenna segments are fastened to the carrier of the electronic chip. The integration of such an electronic member into a tyre allows the risk of deterioration of the member, because of its structure, to be decreased while improving radiocommunication performance and minimizing the risks related to the physical integrity of the tyre.

Specifically, deterioration of the electronic member is generally caused by failures in the electrical connections that exist between the communication radiating antenna and the electronic portion of the member. Here, no mechanical connection is produced since the transfer of energy between the communication antenna and the electronic chip is achieved with an electromagnetic field, via a primary antenna. However, although the size of the radiating antenna, which is linked to the communication frequency band and to its far-field operation, is by nature large, the primary antenna is not subject to this constraint. Thus it is of smaller size in general, allowing the deformations of the tyre to be easily endured without generation of excessively high mechanical stresses within the galvanic junction between it and the electronic chip. Lastly, the supple nature of the radiating antenna limits the risks of the deterioration of the zone of the tyre close to the transponder.

Secondly, the introduction of the primary antenna makes it possible to disassociate contradictory functions between the size of the radiating antenna and the electrical impedance of the electronic portion of the member. It is thus possible to dimension the primary antenna so as to match its electrical impedance to the chip in order to minimize losses and to therefore improve the energy efficiency of the electronic member. The dimensions of the radiating antenna are then chosen solely with respect to the criterion of the communication frequency of the electronic member. All of this tends to improve the radiocommunication performance of the electronic member.

According to one preferred embodiment, the radiating antenna defining a first longitudinal axis, the primary antenna is a coil having at least one turn defining a second longitudinal axis that is circumscribed in a cylinder whose axis of revolution is parallel to the second longitudinal axis and whose diameter is comprised between one third and three times, and preferably between half and two times, the average diameter of the helical spring of the radiating antenna.

Thus, with the primary antenna being a loop antenna, energy is mainly transferred between the radiating antenna and the primary antenna by inductive coupling. This then requires a certain proximity (in order to limit the gap between the two antennas) between the two antennas, requiring the coil of the primary antenna to be dimensioned, with respect to the radiating antenna, in order to ensure a transfer of energy that is sufficiently effective to obtain the desired radiocommunication quality. In concrete terms, the primary antenna may advantageously have a diameter smaller than that of the radiating antenna; in this case the entirety of the electronic portion of the transponder is inserted into the radiating antenna and the assembly is particularly robust in an environment such as that of a tyre.

The antenna may also have a diameter larger than that of the radiating antenna; this case is particularly advantageous when it is desired to add, to the radiofrequency transponder, other, active or passive, electronic components in order to perform additional functions, for example monitoring of the state of the tyre.

According to one advantageous embodiment, the radiating antenna having a central zone between two lateral zones and the primary antenna having a median plane perpendicular to the second longitudinal axis, the first and second longitudinal axes are parallel to each other and the median plane of the primary antenna is placed in the central zone of the radiating antenna.

It is thus ensured that the distance between the radiating and primary antennas is constant along the longitudinal axes of these antennas, thus optimizing, at each element having the length of the primary antenna, an equivalent transfer of energy. In addition, the magnetic field created by a coil through which an electric current flows being maximum at the centre of the length of the coil (in the case of a $\lambda/2$ antenna), it is preferable to place the median plane of the primary antenna in the central zone of the radiating antenna and more preferably at the centre thereof in order to maximize the magnetic field that is the origin of the inductive coupling.

Preferably, in the case of tyres, the primary antenna is placed in the interior of the single-strand helical spring of the radiating antenna.

The electronic member may consist of a radiofrequency transponder. It may also consist of a radiofrequency transponder encapsulated in an electrically insulating encapsulating rubber mass.

It is necessary, for correct radiofrequency operation of the radiating antenna of the electronic member, for said antenna to be embedded in a mass of electrically insulating encapsulating rubber. It is thus possible to use a semi-finished element consisting of a radiofrequency transponder embedded in a mass of electrically insulating rubber to place it into the structure of the tyre during its manufacture in the chosen place.

However, it is also possible to directly place the radiofrequency transponder between two compounds of the tyre when said compounds, because of their formulation, are electrically insulating.

Preferably, the elastic modulus of the encapsulating rubber mass is lower than or equal to the elastic modulus of the adjacent rubber compounds.

According to another aspect, the relative dielectric constant of the encapsulating rubber mass is lower than the relative dielectric constant of the adjacent rubber compounds.

According to one particular embodiment, the outer layer of the antenna may be made up of the brass layer and the rubber compound of the encapsulating rubber mass may be capable of forming a strong adhesive bond with the brass layer after vulcanization.

This embodiment is particularly advantageous in the case that the antenna of the radiofrequency transponder of the electronic member is mechanically dissociated from the electronic chip.

The formulation of encapsulating rubber masses of this type contains for example cobalt salts.

The invention relates more particularly to tyres intended to be fitted to motor vehicles such as passenger vehicles, SUVs ("sport utility vehicles"), two-wheeled vehicles (in particular motorcycles) or aircraft, or industrial vehicles such as vans or heavy-duty vehicles, i.e. underground trains, buses, heavy road transport vehicles (lorries, tractors, trailers) or off-road vehicles such as heavy agricultural or construction vehicles, and other transportation or handling vehicles.

DESCRIPTION OF THE FIGURES

A better understanding of the invention will be obtained on reading the description which will follow, given solely by way of non-limiting example and made with reference to the drawings, in which.

DETAILED DESCRIPTION OF THE INVENTION

In the present description, unless expressly indicated otherwise, all the percentages (%) shown are mass percentages.

Furthermore, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The terms "rubber compound", "rubber" and "compound" are used interchangeably to identify rubber constituents of a tyre.

Figure 1:
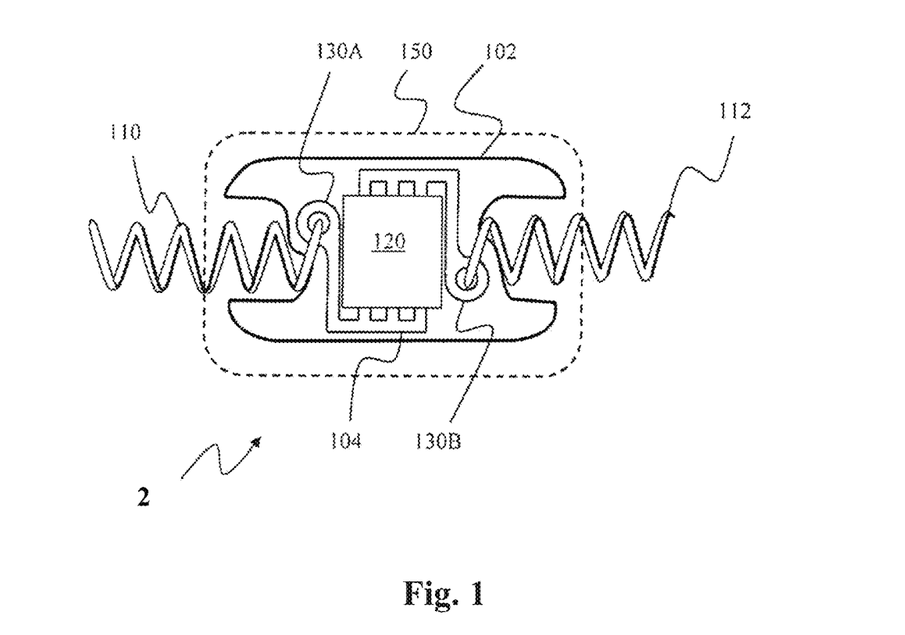
FIG. 1 shows a typical radiofrequency transponder.

FIG. 1 shows an electronic member bearing the general reference 2 that is intended to be encapsulated within encapsulating rubber. In the embodiment illustrated in FIG. 1, the radiofrequency transponder of the electronic member 2 is a typical radiofrequency transponder, such as described in document WO2009134243A1. This transponder 2 comprises an electronic chip 120 fastened to a carrier or PCB (printed circuit board) 102 and galvanically connected, via conductive tracks 104, 130A and 130B, to two half-antennas 110 and 112. The antennas are helical springs the solid core of which is steel wire. The outline 150 represents layers of non-conductive encapsulating rubber covering the PCB, the electronic chip and at least a portion of the two half-antennas.

In what follows, since the two antennas 110 and 112 are identical, just one antenna 110 will be described with reference to FIGS. 2 and 3. The two antennas 110 and 112 constitute a dipole antenna.

The antenna 110 is substantially helical in shape and its length, outer diameter and helix pitch are defined according to the conditions of use of the electronic member. By way of example, the helix pitch may be between 5 and 15 turns per centimetre, the outer diameter may be between 0.8 and 1.5 mm and the length about 25 mm. This combination of features is particularly useful in the case of an electronic member operating in a tyre at UHF in the frequency band between 860 MHz and 960 MHz.

Figure 2:
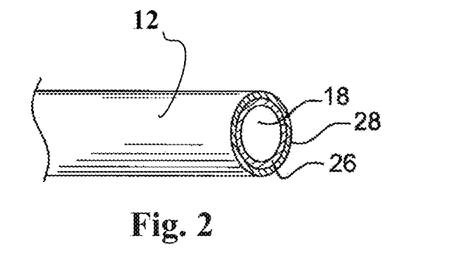
FIG. 2 shows a steel wire that is intended to form an antenna according to one embodiment of the invention.

According to a first embodiment illustrated in FIG. 2, the antenna 110 is made from a steel wire 12 comprising a core 18 made of steel, the outer diameter of which is between 0.15 and 0.32 mm. The wire 12 also comprises a conduction layer 26 coating the core 18 directly. The conduction layer 26 is made of brass and makes contact with the core 18. The thickness of the layer 26 is between 1 and 4 micrometres, and preferably between 0.5 and 2 micrometres. Although the skin thickness for brass at 915 MHz is 4.4 micrometres, a brass layer with a thickness of between 1 and 2 micrometres allows sufficient radiofrequency operation in the frequency range between 860 and 960 MHz.

In the example illustrated in FIG. 2, the wire 12 also comprises an adhesive second layer 28 directly coating the brass layer 26. The layer 28 comprises a water-based and non-metallic adhesive. Chemlok 8210 and 8007 by LORD Corp. are an example of such an adhesive. The primer and the overcoat are applied to the wire 12 in succession, preferably by spraying. The total thickness of the layer 28 is between 1 and 40 µm.

Below 1 µm the success of the adhesion of the antenna to the adjacent rubber may be compromised and above 40 µm the adhesive layer becomes too stiff, which may result in fatigue problems when the antenna is in service.

Spraying makes it possible to obtain a high level of uniformity with low thickness.

The adhesive layer may also be imide-based. It is preferably also applied by spraying, which allows a thickness of about 2 µm to be obtained. Chemlok 6411 or Chemosil 411-NL is such an adhesive.

The adhesive layer ensures lasting intimate contact between the adjacent rubber mass and the antenna after a step of crosslinking the rubber mass.

Figure 3:
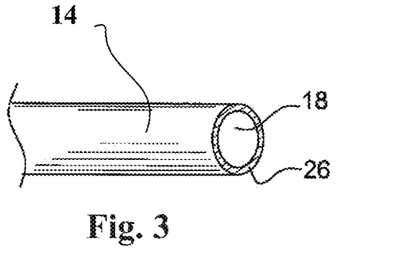
FIG. 3 shows a steel wire that is intended to form an antenna according to another embodiment of the invention.

FIG. 3 shows a second embodiment of a wire 14 intended to form an antenna 110. In this example, the outer layer of the wire 14 is formed by the brass conduction layer 26 and there is no adhesive additional layer.

The formulation of the encapsulating rubber mass, which is used to encapsulate the electronic member and the antenna 110, is in this case suitable for forming, after vulcanization, a solid interface with the antenna. Such formulations include in particular cobalt salts as well known to those skilled in the art.

Figure 4:
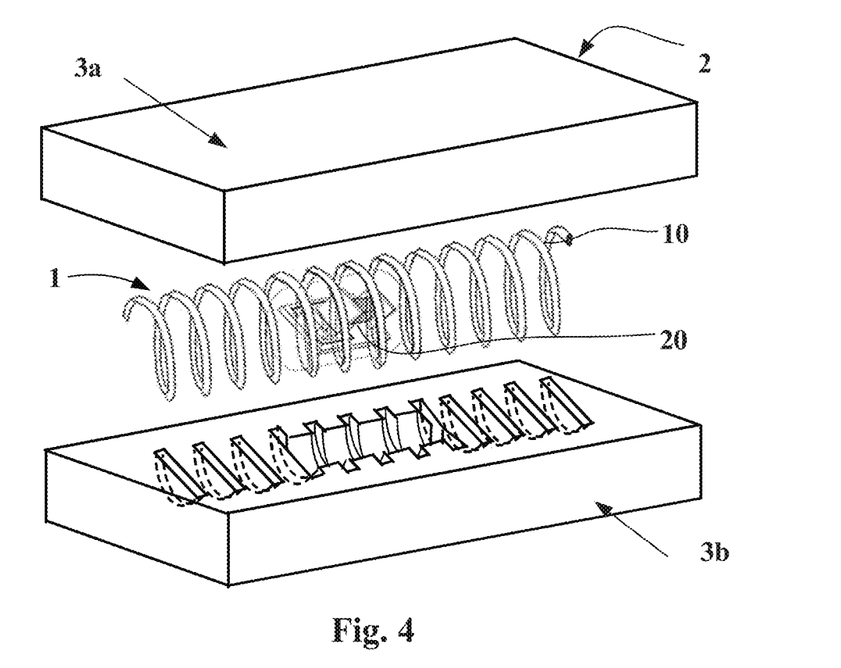
FIG. 4 is a schematic exploded view of an electronic member according to a second embodiment.

FIG. 4 is a exploded view of an electronic member 2. This member 2 comprises a radiofrequency transponder 1 embedded between two layers 3a and 3b of a non-vulcanized electrically insulating rubber compound. Such an electronic member is a semi-finished product able to be integrated into the structure of a tyre during the manufacture thereof.

The encapsulating rubber compound contains 100 phr (parts per 100 parts of rubber by mass) of a polymer such as EPDM (ethylene propylene diene monomer rubber), butyl rubber, neoprene or a diene elastomer such as SBR (styrene-butadiene rubber), polybutadiene, natural rubber or polyisoprene.

The compound may contain fillers such as silica, carbon black, chalk and kaolin fillers:
- with a silica filler in a maximum amount of 50 phr;
- with a carbon black filler of ASTM grade higher than 700, in an amount lower than 50 phr;
- with a carbon black filler of grade lower than or equal to 500, in a maximum amount of 20 phr.
- It is possible to add or replace these fillers with chalk or kaolin.

Such amounts and types of fillers make it possible to guarantee a relative permittivity lower than 6.5, in particular at a frequency of 915 MHz.

The stiffness in the cured state of the encapsulating compound is preferably lower than or close to those of the adjacent compounds.

The radiofrequency transponder 1 of the electronic member 2 such as shown in FIG. 4 corresponds to a second embodiment of the electronic member 2 that will now be described.

The radiofrequency transponder 1 according to the second embodiment of the electronic member 2 comprises an electronic chip 22 and a half-wave radiating antenna 10 able to communicate with an external radiofrequency reader. It in addition comprises a primary antenna 24 electrically connected to the electronic chip 22 and inductively coupled to the radiating antenna 10. The radiating antenna is a dipole antenna consisting of a single-strand helical spring defining a first longitudinal axis.

Figure 5:
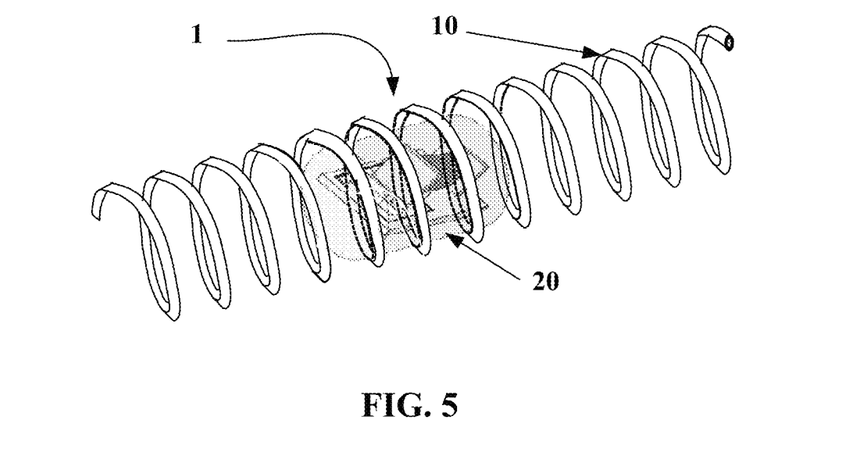
FIG. 5 is a perspective view of a radiofrequency transponder according to one embodiment of the invention in a configuration in which the electronic portion is located in the interior of the radiating antenna.

FIG. 5 shows a radiofrequency transponder 1 in a configuration in which the electronic portion 20 is located in the interior of the radiating antenna 10. The geometric shape of the electronic portion 20 is circumscribed in a cylinder the diameter of which is smaller than or equal to the inside diameter 13 of the helical spring 10. The threading of the electronic portion 20 into the half-wave radiating antenna 10 is facilitated thereby. The median plane 21 of the primary antenna is located in the central zone of the radiating antenna and substantially superposed on the median plane 19 of the radiating antenna 10.

Figure 6:
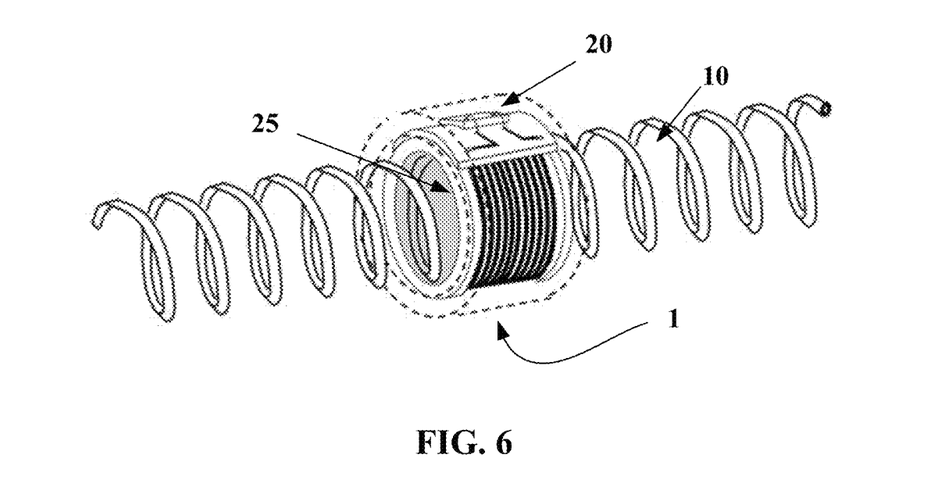
FIG. 6 is a perspective view of a radiofrequency transponder according to the invention in a configuration in which the electronic portion is located on the exterior of the radiating antenna.

FIG. 6 shows a radiofrequency transponder 1 in a configuration in which the electronic portion 20 is located outside the radiating antenna 10. The geometric shape of the electronic portion 20 has a cylindrical cavity 25 the diameter of which is larger than or equal to the outside diameter 15 of the half-wave radiating antenna 10. The threading of the half-wave radiating antenna 10 into the cylindrical cavity 25 of the electronic portion is thus facilitated thereby. The median plane 21 of the primary antenna is located in the central zone of the radiating antenna and substantially in line with the median plane 19 of the radiating antenna 10.

Figure 7:
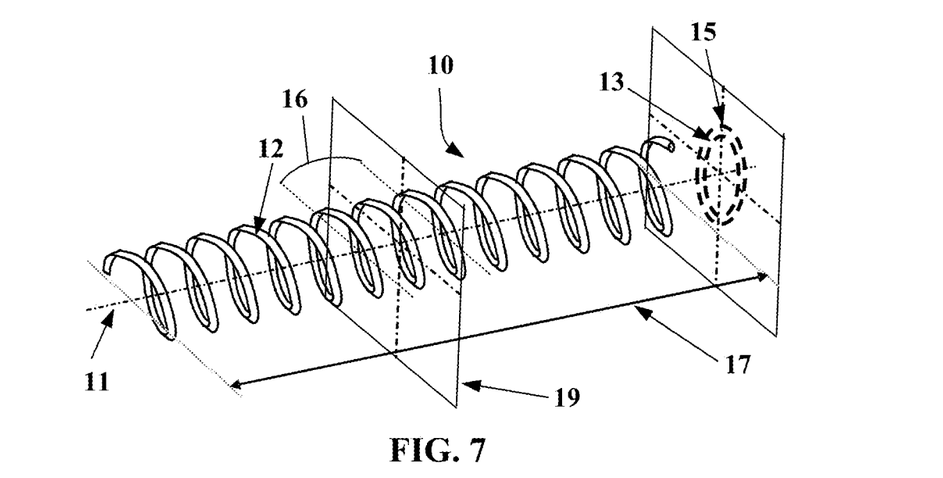
FIG. 7 is a detail view of a radiating antenna of a radiofrequency transponder according to one embodiment of the invention.

FIG. 7 shows a radiating antenna 10 consisting of the steel wire 12 of FIG. 2, or of the wire of FIG. 3, that has been plastically deformed in order to form a helical spring having an axis of revolution 11. This steel wire is coated with a brass conduction layer 26 which is covered, in the case of FIG. 2, with an adhesive layer 28.

The steel wire may be coated with these layers then formed; alternatively it may also be formed then coated.

The helical spring is primarily defined by a winding diameter of the coated wire and by a helix pitch. Thus, given the diameter of the wire, inside 13 and outside 15 diameters of the helical spring are precisely determined. The length 17 of the spring 10 here corresponds to one half-wavelength of the transmission signal of the radiofrequency transponder 1 in a rubber mass. It is therefore possible to define a median plane 19 of the helical spring 10 perpendicular to the axis of revolution 11 separating the radiating antenna into two equal portions. This plane is in the middle of the central zone 16 of the radiating antenna, this central zone 16 corresponding to about 25% of the total length of the antenna and preferably 15%.

Figure 8:
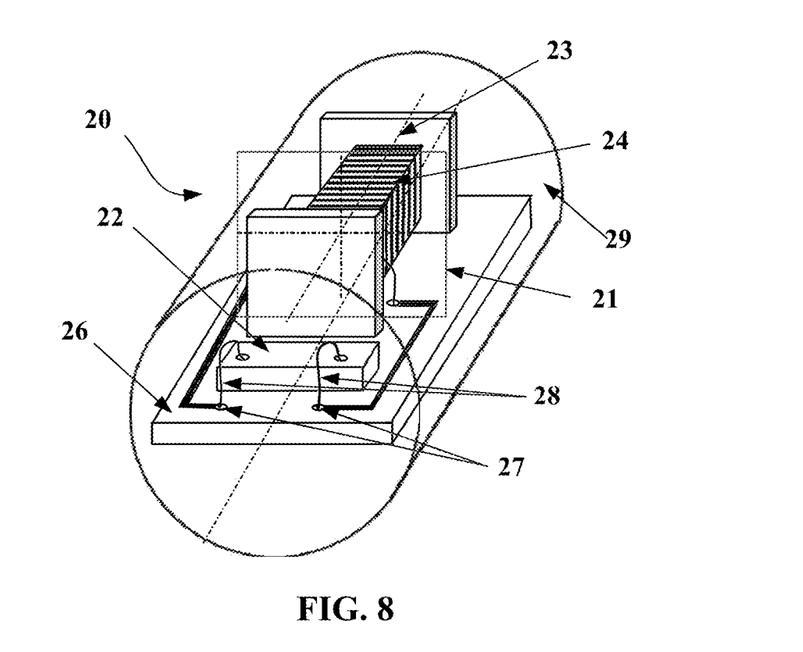
FIG. 8 is a perspective view of the electronic portion of a radiofrequency transponder in a configuration in which the electronic portion is located in the interior of the radiating antenna.

FIG. 8 shows the electronic portion 20 of a radiofrequency transponder 1 intended for a configuration in which the electronic portion 20 is located in the interior of the radiating antenna 10. The electronic portion 20 comprises an electronic chip 22 and a primary antenna 24 that is electrically connected to the electronic chip 22 via a printed circuit board 26. The primary antenna here consists of a surface-mount-device (SMD) microcoil having an axis of symmetry 23. The median plane 21 of the primary antenna defined by a normal parallel to the axis of symmetry 23 of the SMD coil and separating the coil into two equal portions is determined. The components on the printed circuit board are electrically connected using tracks made of copper terminated by copper pads 27. The components on the printed circuit board are electrically connected using the wire-bonding technique by gold wires 28 running between the component and the pads 27. The assembly consisting of the printed circuit board 26, of the electronic chip 22 and of the primary antenna 24 is embedded in a rigid mass 29 made of electrically insulating high-temperature epoxy resin forming the electronic portion 20 of the radiofrequency transponder 1.

This radiofrequency transponder 1 has the advantage of being much more mechanically resistant than conventional transponders and thus is particularly suitable for a hostile use such as encountered with run-flat tyres.

Figure 9:
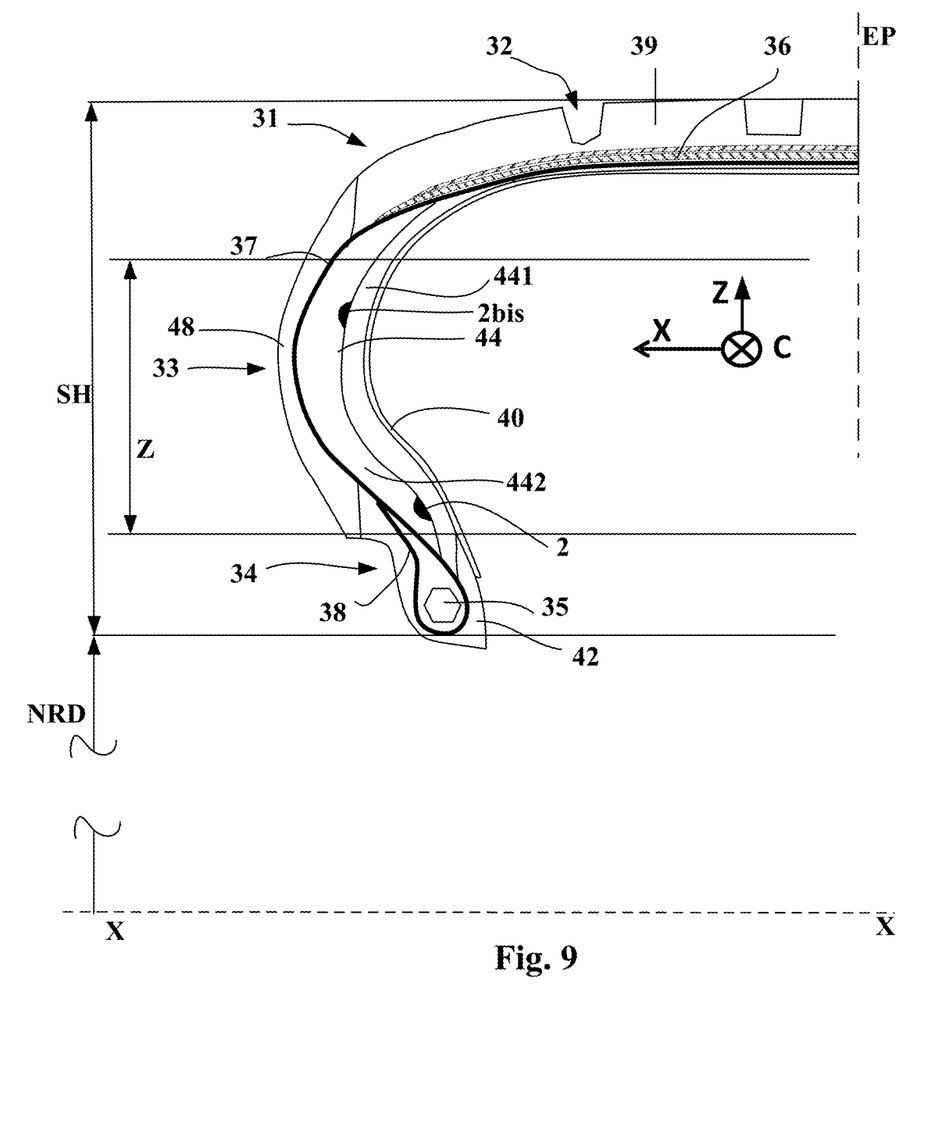
FIG. 9 is a partial axial sectional view of a tyre including an electronic member according to the invention.

FIG. 9 is a partial axial sectional illustration of a tyre capable of running flat and fitted with an electronic member according to the invention. This figure indicates the axial X, circumferential C and radial Z directions and also the median plane EP (plane perpendicular to the axis of rotation of the tyre which is situated halfway between the two beads of the tyre and passes through the middle of the crown reinforcement) and the axis of rotation XX of the tyre 30.

This figure also gives the sectional height SH of the tyre, i.e. the radial distance between the nominal diameter of the mounting rim of the tyre NRD and the radially outermost portion of the tread of the tyre. In the context of this document, the diameter of the tyre as given by the size thereof is taken to be the nominal diameter of the mounting rim of the tyre.

The tyre is shown free, not mounted on a rim and such that the width between the two beads is decreased to the width of the nominal ETRTO rim.

As regards the axial direction, what is meant by "axially external" is an axial direction directed towards the exterior of the tyre and by "axially internal" what is meant is an axial direction directed towards the median plane EP of the tyre.

The tyre 30 illustrated in FIG. 9 is a tyre that is capable of running flat, but it is chosen purely by way of illustration and the antennas and electronic members that are described may be incorporated within and on the surface of any type of tyre as mentioned above.

This run-flat tyre 30 comprises a crown 32 reinforced by a crown reinforcement or belt 36, a sidewall 33 and a bead 34, the bead 34 being reinforced with a bead wire 35. The crown reinforcement 36 is surmounted radially externally by a rubber tread 39. A formed carcass reinforcement 37 is wound around the bead wire 35 in the bead 34, the turn-up 38 of this reinforcement 37 being, for example, arranged towards the exterior of the tyre 30. In a manner known per se, the carcass reinforcement 37 is made up of at least one ply reinforced by what are known as "radial" cords, for example here of textile, that is to say that these cords are disposed virtually parallel to one another and extend from one bead to the other so as to form an angle of between 80° and 90° with the median circumferential plane EP. An airtight inner liner 40 extends from one bead to the other radially internally with respect to the carcass reinforcement 37. The bead 34 comprises a protective rubber (or "protector") 42 able to make contact with the surface of a rim. It also comprises a first filling rubber 46 extending radially externally relative to the bead wire 35.

The tyre 30 is able to run flat because of the presence of a sidewall insert 44 placed axially internally relative to the carcass reinforcement 33. This insert 44 allows the structure of the tyre to withstand the load at zero pressure. The order of magnitude of the extension modulus of a rubber for a sidewall insert is about twice the value of the modulus of a sidewall rubber or more.

The sidewall insert 44 of FIG. 9 includes an electronic member 2 placed at a radial distance D1 from the point H. The point H is one of the points closest to the axis of rotation XX. The distance D must be larger than D0 equal to 20 mm in order not to penalize the communication quality between the electronic member and an external reader. This distance is greater than the height of a typical rim flange, which is 17.5 mm.

The electronic member is preferably placed within the semi-finished sidewall insert before its incorporation within the green tyre.

The sidewall insert 44, in the example of FIG. 9, consists of two rubber masses 441 and 442 that are axially adjacent to one another and the electronic members 2 and 2bis are placed at the interface between the two rubbers 441 and 442.

This embodiment facilitates the precise and reproducible placement of the electronic members during the building of the tyre.

FIG. 9 illustrates the zone Z of the sectional height SH of the tyre within which the electronic members are preferably positioned. This zone Z runs from 20 to 70% of SH. The electronic member 2 is placed at around 25% of SH and the member 2bis at 60%.

In FIG. 9, the electronic member is placed at around 45% of SH.

The table below gives the results of tests of the communication power of the radiofrequency transponder carried out using antennas with conduction layers of varying thicknesses. In these tests, the power returned by the radiofrequency transponder to an external reader, following the energy transmitted by this same external reader, is evaluated. This external reader, which is positioned at a distance of around 1 metre away from the radiofrequency transponder, transmits the same exciter signal for all of the samples. Based on the response spectra measured by the external reader in the frequency range between 860 MHz and 960 MHz, the power received by the external reader is evaluated as the integral of the response spectrum over the frequency range. The power differences are expressed logarithmically.

| Configuration | Diameter of the steel wire (mm) | Thickness of brass (µm). | Delta versus reference (difference in dBm) |
| --- | --- | --- | --- |
| Reference | 0.202 | 4 Cu 0.5 Ni | — |
| E1 | 0.226 | 1.5 | 0.8 |
| T1 | 0.226 | 0.15 | 2.5 |
| T2 | 0.180 | 0 | 3.1 |
| T3 | 2.22 | 0.15 | 1.7 |

The reference corresponds to a radiofrequency transponder such as presented in document WO 2012020202 A1. The antenna includes a copper conduction layer with a thickness of 4 µm coated with a chemically insulating layer with a thickness of 0.5 µm which is intended to protect the copper from the adjacent rubber compounds. All of the antennas also include a water-based adhesive layer such as described above.

This reference transponder is incorporated within the structure of heavy-duty tyres on an everyday basis.

The transponder T1 has an antenna with a diameter of 0.226 mm and a brass layer with a thickness of 1.5 µm. The communication power is decreased by 0.8 dBm. This decrease is substantial but does not at all rule out the use of such an antenna wire in an application inside a tyre. Specifically, this corresponds to a decrease of the optimal read distance by around 8%. This demonstrates that, contrary to what was commonly believed, a conduction layer with a thickness of below 4.4 µm in the case of brass is entirely usable.

Examples T1 and T2 are made using steel wires including brass conduction layers of 0.15 µm for T1 and 0 µm for T2. In this case, the communication powers are insufficient for reliable tyre use.

Lastly, example T3 made using a steel wire with a diameter of 2.22 mm and a brass conduction layer of 0.15 µm demonstrates that increasing the diameter of the steel wire is entirely favourable for radiofrequency communication. However, such a wire diameter is not usable due to the need for it to be shaped as a helix.

The invention claimed is:

1. A half-wave radiating antenna for an electronic member, the length of which is operable in a frequency range between 860 MHz and 960 MHz, comprising a core coated with a brass coating, wherein a thickness of the brass coating is between 1.0 and 2.0 µm.

2. The half-wave radiating antenna according to claim 1, wherein the thickness of the brass coating ranges from 1.2 to 1.8 µm.

3. The half-wave radiating antenna according to claim 1, wherein the core of the antenna is made of steel.

4. The half-wave radiating antenna according to claim 3, wherein a carbon content of the steel of the core is below 1%.

5. The half-wave radiating antenna according to claim 1, wherein the brass coating is covered with an adhesive layer.

6. The half-wave radiating antenna according to claim 5, wherein the adhesive layer is non-metallic and water-based.

7. The half-wave radiating antenna according to claim 5, wherein the adhesive layer is imide-based.

8. The half-wave radiating antenna according to claim 1, wherein the half-wave radiating antenna has at least one helical portion.

9. An electronic member comprising a radiofrequency transponder comprising an electronic chip and the half-wave radiating antenna according to claim 1, capable of communicating with an external radiofrequency reader.

10. The electronic member according to claim 9, wherein the half-wave radiating antenna comprises two helical antenna segments and the electronic chip is galvanically connected to the two helical antenna segments.

11. The electronic member according to claim 9, wherein the radiofrequency transponder of the electronic member further comprises a primary antenna that is electrically connected to the electronic chip, wherein the primary antenna is inductively coupled to the half-wave radiating antenna, wherein the half-wave radiating antenna is a dipole antenna consisting of a single-strand helical spring defining a first longitudinal axis, and wherein the primary antenna is a coil having at least one turn defining a second longitudinal axis that is circumscribed in a cylinder, an axis of revolution of which is parallel to the second longitudinal axis and a diameter of which is comprised between one third and three times an average diameter of the helical spring of the half-wave radiating antenna.

12. The electronic member according to claim 11, wherein the half-wave radiating antenna has a central zone between two lateral zones and the primary antenna has a median plane perpendicular to the second longitudinal axis, wherein the first and second longitudinal axes are parallel to one another, and wherein the median plane of the primary antenna is arranged in the central zone of the half wave radiating antenna.

13. The electronic member according to claim 11, wherein the primary antenna is placed in an interior of the single-strand helical spring of the half-wave radiating antenna.

14. The electronic member according to claim 9, wherein the radiofrequency transponder is encapsulated in at least one electrically insulating encapsulating rubber mass.

15. A tire comprising an electronic member according to claim 9.

* * * * *